(12) United States Patent
Chiverton

(10) Patent No.: US 7,351,864 B2
(45) Date of Patent: Apr. 1, 2008

(54) PROCESS FOR PREPARATION OF MANNICH CONDENSATION PRODUCTS USEFUL AS SEQUESTERING AGENTS

(75) Inventor: Edward A. Chiverton, San Francisco, CA (US)

(73) Assignee: Chevron Oronite Company LLC, San Ramon, CA (US)

( * ) Notice: Subject to any disclaimer, the term of this patent is extended or adjusted under 35 U.S.C. 154(b) by 162 days.

(21) Appl. No.: 11/105,605

(22) Filed: Apr. 13, 2005

(65) Prior Publication Data

US 2006/0234880 A1    Oct. 19, 2006

(51) Int. Cl.
*C07C 209/00* (2006.01)

(52) U.S. Cl. .................................................... 564/393

(58) Field of Classification Search ................. 564/393
See application file for complete search history.

(56) References Cited

U.S. PATENT DOCUMENTS

| | | |
|---|---|---|
| 3,877,889 A | 4/1975 | Dix |
| 4,032,304 A | 6/1977 | Dorer, Jr. et al. |
| 4,069,249 A | 1/1978 | Gaudette et al. |
| 4,116,991 A | 9/1978 | Leneuf |
| 4,130,582 A | 12/1978 | Petree et al. |
| 4,166,726 A | 9/1979 | Harle |
| 4,197,091 A | 4/1980 | Gainer |
| 4,200,545 A | 4/1980 | Clason et al. |
| 4,225,502 A | 9/1980 | Gaudette et al. |
| 4,338,460 A | 7/1982 | Gaudette et al. |
| 4,387,244 A * | 6/1983 | Scanlon et al. .............. 562/448 |
| 4,655,949 A * | 4/1987 | Landry et al. .............. 508/367 |
| 4,734,212 A | 3/1988 | Harrison |
| 4,847,415 A | 7/1989 | Roling et al. |
| 4,883,580 A | 11/1989 | Roling et al. |
| 4,894,139 A | 1/1990 | Roling et al. |
| 5,122,161 A | 6/1992 | Benfaremo et al. |
| 5,641,394 A | 6/1997 | Fisher et al. |
| 6,126,837 A | 10/2000 | Miknevich et al. |

FOREIGN PATENT DOCUMENTS

EP    0 240 291 B1    11/1990

OTHER PUBLICATIONS

Didier Jamois, et al., Preparation of Amphiphilic Polyisobutylenes-b-polyethylenamines by Mannich Recation III. Synthesis of Polyisobutylenes-b-polyethylenamines. Laboratoire de Synthese Macromoleculaire, pp. 1959-1966, Boite 184, Universite P. et M. Curie, 4, Place Jussieu, 75252 Paris Cedex 05, France.

* cited by examiner

*Primary Examiner*—Yvonne Eyler
*Assistant Examiner*—Kellette Gale
(74) *Attorney, Agent, or Firm*—Sarita R. Kelley

(57) ABSTRACT

The present invention is directed to a process for preparing Mannich condensation product sequestering agents or mixtures of Mannich condensation product sequestering agents for use in fuels and lubricating oils.

27 Claims, No Drawings

PROCESS FOR PREPARATION OF MANNICH CONDENSATION PRODUCTS USEFUL AS SEQUESTERING AGENTS

FIELD OF THE INVENTION

The present invention is directed to a process for preparing Mannich condensation product sequestering agents or mixtures of Mannich condensation product sequestering agents for use in fuels and lubricating oils.

BACKGROUND OF THE INVENTION

Lubricating oils contain additives that perform many important functions. Ashless dispersants are added to lubricating oils to disperse varnish, lacquer, and sludge that may be formed in the oil and prevent the formation of deposits. Ashless dispersants also disperse soot and prevent viscosity buildup caused by the agglomeration of soot in the oil. Overbased detergents are added to lubricating oils to neutralize acids. These acids can cause wear and corrosion, and can cause acid catalyzed reactions and rearrangements to occur in the oil. Anti-oxidants are added to lubricating oils to control oxidation of the oil by scavenging radicals or by decomposing hydroperoxides that are formed from the oxidation of the oil. Wear inhibitors are added to lubricating oils to prevent wear of the metal parts caused by friction. Other additives such as corrosion inhibitors, friction modifiers, viscosity index improvers, pour point depressants, seal swell agents, etc., can also be added to lubricating oils to provide important properties to the finished lubricant.

Metal ions can play an important role in the deterioration of lubricating oils. Transition metals such as $Fe^{+3}$, $Cu^{+2}$, $Pb^{+2}$, and other metals, can catalyze the oxidation of the oil resulting in the formation of the primary oxidation products such as hydroperoxides, carboxylic acids, carbonyl compounds, hydroxyl carbonyl compounds, and the like. In addition, metal ions such as $Fe^{+3}$, $Cu^{+2}$, $Pb^{+2}$, and other metals, can catalyze the polymerization of the primary oxidation products resulting in the formation of sludge, lacquer, and varnish.

In order to prevent the metal catalyzed oxidation and polymerization of lubricating oils, it would be desirable to find a way to complex or sequester the metal ions to prevent the metal ions from acting as oxidation and polymerization catalysts.

Sequestering agents have many uses, in living plants for supplying necessary trace elements, in metal plating bath, removing rust stains, and in fuels and lubricating oils. Most well known sequestering agents are useful only in aqueous media. There is a great need for good sequestering agents that are oil-soluble. Oil-soluble sequestering agents are also useful for the introduction of metals into non-aqueous systems, for providing oil-borne micro-nutrients to plants and many other uses known to persons skilled in the art. Oils useful for lubricating internal combustion engines are generally either mineral oils or synthetic oils of lubricating viscosity. Thus, sequestering agents for use in lubricating oils or hydrocarbon fuels must be oil-soluble.

The conventional oil-soluble Mannich condensation products are useful in internal combustion engine fuels. Non-volatile constituents of fuel, such as additives, sometimes form deposits or varnish on inlet valves and on heating elements. Such deposits and varnish impair the efficiency of these elements. In addition, fuels are susceptible to chemical reactions, such as oxidation, on aging. One effect of oxidation is to produce soluble and insoluble materials that form deposits which interfere with the proper functioning of the internal combustion engines. The conventional oil-soluble Mannich condensation products help to reduce deposits.

Oil-soluble Mannich condensation products are also useful in internal combustion engine lubricating oils. These products generally act as dispersants to disperse sludge, varnish, and lacquer, and prevent the formation of deposits. In general, conventional oil-soluble Mannich condensation products are formed from the reaction of alkylphenols with formaldehyde and an amine or a polyamine. These products have limited ability to sequester $Fe^{+3}$ and have limited ability to prevent the $Fe^{+3}$ catalyzed oxidation and polymerization that often occur.

Water-soluble Mannich condensation products are well known as sequestering agents. However, such products cannot be used as sequestering agents in fuels and lubricating oils.

The preparation of Mannich condensation products is well known in the art. A number of patents have disclosed Mannich condensation products of alkylphenols, aldehydes and amines. However, none of the known Mannich condensation products contain both the needed oil solubility and the ability to sequester $Fe^{+3}$ to prevent $Fe^{+3}$ catalyzed oxidation and polymerization reactions in lubricating oil.

U.S. Pat. No. 4,032,304 discloses an improved fuel composition containing a normally liquid fuel, a carboxylic acid ester of lubricating viscosity and an oil-soluble nitrogen-containing dispersant. The dispersant is characterized by the presence therein of a substantially saturated hydrocarbon-based radical having at least 50 carbon atoms. The dispersant is preferably a carboxylic dispersant or a Mannich-type dispersant. The Mannich-type dispersant is for example the reaction product of an alkylphenol with formaldehyde and a polyethylene polyamine.

U.S. Pat. No. 4,069,249 discloses a novel Mannich condensation product chelating agent for iron (III) or iron (II). The chelating agent is a Mannich condensation product made from phenol or substituted-phenol, formaldehyde, a di-amino di-acid and a diamine. The process for making these Mannich condensation products is disclosed in U.S. Pat. No. 4,338,460.

U.S. Pat. No. 4,166,726 discloses a fuel additive and fuel composition. The additive compound is a mixture of a polyalkylene amine and the reaction product of an alkylphenol, an aldehyde and an amine. The additive provides surprising stability in preventing thermal degradation of fuels, particularly fuels for compression ignition engines.

U.S. Pat. No. 4,116,991 discloses an aromatic chelating agent having a hydroxyl group at the center of the molecule. Such chelating agents have better stability in an alkaline environment.

U.S. Pat. No. 4,130,582 discloses a process for the preparation of phenolic ethylenediamine polycarboxylic acids in predominantly the ortho isomeric form which comprises reacting a phenol compound, ethylenediamine, glyoxylic acid and a base, said phenol compound functioning both as a reactant and as a solvent for the reaction system.

U.S. Pat. No. 4,197,091 discloses a composition for inhibiting the corrosion of ferrous metal pipelines used to transport petroleum hydrocarbons comprising a major portion of a mixture of $C_{36}$ dicarboxylic dimer acid and a $C_{54}$ trimer acid, which mixture has an acid number of at least 110 and from 0.5% up to 5% of a composition from the group consisting of (a) an N,N'-di(ortho-hydroxyarylidene)-1,2-alkyldiamine in which the arylidene radical contains 6-7 carbon atoms and the alkylene radical contains 2-3 carbon atoms; and (b) a polymeric condensation product obtained by the reaction of a phenol having two reactive ring positions, a lower aliphatic aldehyde and a polyamine.

U.S. Pat. No. 4,225,502, a division of application Ser. No. 630,792, U.S. Pat. No. 4,069,249 discussed above, discloses a novel Mannich condensation product chelating agent for iron (III) or iron (II). The chelating agent is a Mannich condensation product made from phenol or substituted-phenol, formaldehyde, a di-amino di-acid and a diamine. The single claim is to a cyano substituted compound.

U.S. Pat. No. 4,200,545 discloses combinations of amino phenols, wherein said phenols contain a substantially saturated hydrocarbon substituent of at least 10 aliphatic carbon atoms, and one or more detergent/dispersants selected from the group consisting of (I) neutral or basic metal salts of an organic sulfur acid, phenol or carboxylic acid; (II) hydrocarbyl-substituted amines wherein the hydrocarbyl substituent is substantially aliphatic and contains at least 12 carbon atoms; (III) acylated nitrogen-having compounds having a substituent of at least 10 aliphatic carbon atoms; and (IV) nitrogen-having condensates of a phenol, aldehyde and amino compound. Fuels and lubricants having such combinations as additives are particularly useful in two-cycle (two-stroke) engines.

U.S. Pat. No. 4,387,244 discloses that alkyl-substituted hydroxy benzyl amino acid oligomers are effective metal chelating agents in a broad range of non-aqueous systems. The products claimed display surprisingly high solubilities in a broad range of substituted and unsubstituted aliphatic and aromatic solvents.

U.S. Pat. No. 4,655,949 discloses a novel lubricating oil composition comprising an organometallic additive, including a metal selected from Groups I, Ib and VIII of the Periodic System of Elements, e.g. Na, K, Cu, Co, Ni or Fe, chelated with the reaction product of formaldehyde, an amino acid and a phenol, dissolved in a lubricating oil. Depending on the choice of metal, the above organometallic additive imparts rust inhibition, sludge dispersant, wear reduction and anti-oxidant properties to the said lubricating oil.

U.S. Pat. No. 4,734,212 discloses Bis-Mannich base deposit inhibitors; lubricating oil compositions having these inhibitors and a process for preparing these inhibitors.

U.S. Pat. No. 4,847,415 discloses certain Mannich reaction products (i.e. alkylated phenol, polyoxyalkylenediamine, and an aldehyde) which are used to deactivate iron species already present in hydrocarbon fluids. Left untreated, such iron species lead to decomposition resulting in the formation of gummy, polymer masses in the hydrocarbon liquid. The method for the preparation of these Mannich condensation products are claimed in the divisional U.S. Pat. No. 4,883,580.

U.S. Pat. No. 4,894,139 discloses certain Mannich reaction products formed from the reaction of an alkyl-substituted catechol, a polyamine and an aldehyde which are used to deactivate copper metal species contained in hydrocarbon fluids. Left untreated, such species lead to decomposition resulting in the formation of gummy, polymer masses in the hydrocarbon liquid.

U.S. Pat. No. 5,122,161 discloses a diesel fuel composition comprising (a) a major portion of a diesel fuel, and (b) a minor amount, as a diesel fuel injector detergent, of a glycolated Mannich coupled product of bis-polyisobutylene succinimide of a polyamine, prepared by: (i) reacting an alkylsuccinic acid anhydride with a polyamine to form a bis-succinimide; (ii) reacting the bis-succinimide with a phenol in the presence of an aldehyde to form a Mannich phenol coupled bis-succinimide product; (iii) glycolating the Mannich phenol coupled bis-succinimide product with glycolic acid to form a glycolated Mannich phenol coupled bis-succinimide product; and (iv) recovering the glycolated Mannich phenol coupled bis-succinimide product.

U.S. Pat. No. 5,641,394 discloses a composition for use in deactivating iron species in hydrocarbon fluids, comprising the products resulting from the reaction of (I) a substituted-catechol, (II) a mixture of polyamines, and (III) an aldehyde. The composition also functions as an anti-oxidant in hydrocarbon fluids. The anti-oxidant function is separate from, and in addition to the metal deactivating properties of the invention. These functional properties of the invention can act either singly, or in concert, for stabilization of hydrocarbon fluids.

U.S. Pat. No. 6,126,837 discloses methods for removing suspended particles from a solution. The methods generally comprise adding to the solution to be treated an effective amount of a composition comprising a Mannich derivatized polyether. The polyether is generally described as the condensation polymer of Mannich derivatized bisphenol and a di-functional monomer.

An article titled "Preparation of Amphiphilic Polyisobutylenes-b-polyethylenamines by Mannich Reaction. III. Synthesis of Polyisobutylenes-b-polyethylenamines," by J. D. Jamois, M. Tessier and E. Marechal, Journal of Polymer Science: Part A: Polymer Chemistry, Vol. 31, 1959-1966 (1993) discloses preparation of copolymers associating alpha-phenololigoisobutylene and triethylenetetramine blocks in the same chain by reacting aqueous formaldehyde with alpha-phenololigoisobutylene and triethylenetetramine.

SUMMARY OF THE INVENTION

The present invention is directed a process for preparing a Mannich condensation product sequestering agent or mixtures of Mannich condensation product sequestering agents for use in fuels and lubricating oils.

Unlike conventional processes for preparing Mannich condensation product sequestering agents using amino acids as the source for the amine reactant the process of the present invention involves a two step process that does not require the use of alkanols, such as methanol, or aromatic solvents, such as $C_9$ aromatic solvents, to assist in the handling of reactants and in conducting the Mannich reaction.

More specifically, the present invention is directed to a process for preparing a Mannich condensation product sequestering agent comprising:

reacting
(a) a polyalkyl-substituted hydroxyaromatic compound, wherein the polyalkyl group has a number average molecular weight of from about 280 to about 5,000 and an aldehyde in the presence of an alkali metal base; with
(b) an alkali metal base; and an amino acid or ester derivative thereof and an alkali metal base.

In another embodiment of the above process the reacting is conducted in the absence of an alkanol.

Another embodiment of the process of the present invention is directed to preparing a Mannich condensation product sequestering agent comprising the steps of:

(a) forming a reaction mixture by combining formaldehyde or an aldehyde having the formula

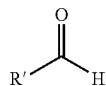

wherein R' is branched or linear alkyl having one carbon atom to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms; with a polyalkyl-substituted hydroxyaromatic compound having the formula

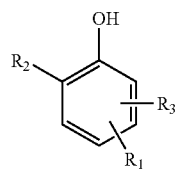

wherein $R_1$ is polyalkyl of 280 to 5,000 molecular weight, $R_2$ is hydrogen or lower alkyl having one carbon atom to about 10 carbon atoms, and $R_3$ is hydrogen or —OH, in the presence of a base; and (b) contacting the reaction mixture with an amino acid or the ester derivative thereof having the formula

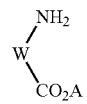

wherein W is —[CHR"]—$_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4, and A is hydrogen or alkyl having one carbon atom to about 6 carbon atoms; and a base to form the Mannich condensation product.

Preferably in the above formula A is hydrogen.

In another preferred embodiment of the invention, in the above formula, A is alkyl selected from methyl or ethyl.

In an alternate embodiment of the process of the present invention water may be added in Step (b).

In a further embodiment of the process of the present invention Step (b) involves contacting the reaction mixture of Step (a) with an amino acid salt having the formula

wherein w is as defined above and M is an alkali metal ion.

In the formula in the above process M is preferably a sodium ion or potassium ion, more preferably M is a sodium ion.

In the above processes, preferably the $R_1$ polyalkyl group has a number average molecular weight of about 400 to about 3,000. More preferably the $R_1$ polyalkyl group has a number average molecular weight of about 500 to about 2,000. Even more preferably the $R_1$ polyalkyl group has a number average molecular weight of about 700 to about 1,500. Most preferably the $R_1$ polyalkyl group has a number average molecular weight of about 700 to about 1,100.

In the above processes, the polyalkyl substituent on the polyalkyl-substituted hydroxyaromatic compound in step (a) is preferably derived from polypropylene, polybutene, or a polyalpha olefin oligomer of 1-octene or 1-decene. The polyalkyl-substituted hydroxyaromatic compound in step (a) in the above process is more preferably polypropyl or polyisobutyl. In the above process in step (a), preferably the polyalkyl-substituted hydroxyaromatic compound is polyisobutyl-substituted phenol or polyisobutyl-substituted o-cresol. More preferably the polyalkyl-substituted hydroxyaromatic compound is polyisobutyl-substituted phenol.

Preferably, in the above processes the polyisobutyl-substituted phenol is derived from polyisobutene containing at least about 20 weight percent methylvinylidene isomer. More preferably the polyisobutyl-substituted phenol is derived from polyisobutene containing at least about 50 weight percent methylvinylidene isomer and most preferably the polyisobutyl-substituted phenol is derived from polyisobutene containing at least about 70 weight percent methylvinylidene isomer.

The aldehyde in step (a) in the above processes is preferably formaldehyde, paraformaldehyde or formalin. More preferably the aldehyde in step (a) is paraformaldehyde.

In the above processes, preferably the base in each of steps (a) and (b) is independently an alkali metal hydroxide. More preferably the alkali metal hydroxide is sodium hydroxide base in each of steps (a) and (b).

In another preferred embodiment of the present process, before performing step (b), the amino acid, base and water are first combined separately at a temperature in the range of about 15° C. to about 100° C. to form a concentrated amino acid salt solution and then added to the reaction mixture formed in step (a). Preferably before performing step (b) the amino acid, base and water are first combined separately at a temperature in the range of about 30° C. to about 70° C. to form a concentrated amino acid salt solution and then added to the reaction mixture formed in step (a). More preferably before performing step (b) the amino acid, base and water are first combined separately at a temperature in the range of about 40° C. to about 60° C. to form a concentrated amino acid salt solution and then added to the reaction mixture formed in step (a).

The amino acid employed in step (b) in the above processes is preferably glycine and the preferred salt is the sodium glycine salt.

In yet another embodiment of the above processes of the present invention each of Steps (a) and (b) is independently conducted in the absence of an alkanol.

If the Mannich condensation product sequestering agent prepared by the above process is to be used as an additive in lubricating oil, then in step (a) the polyalkyl-substituted hydroxyaromatic compound may be first dissolved in an oil of lubricating viscosity. Preferably the oil of lubricating viscosity is a neutral oil.

The Mannich condensation products prepared by the process of the present invention may also be employed as dispersants in lubricating oil. For use as dispersants in fuels the alkali metal ions in Mannich condensation products are replaced with ammonium ions.

Among other factors, the present invention is based upon the discovery that the Mannich condensation products described herein can be obtained by the unique two-step process of the present invention. Such Mannich condensation products are effective in sequestering metals, especially $Fe^{+3}$, and preventing metal ion catalyzed oxidation and polymerization reactions, while maintaining sufficient oil solubility for use in lubricating oils and fuels.

DETAILED DESCRIPTION OF THE INVENTION

Definitions

As used herein, the following terms have the following meanings unless expressly stated to the contrary:

The term "aldehydes" as used herein refers to formaldehyde or aldehydes having the formula

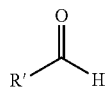

wherein R' is a branched or linear alkyl, having from one carbon atom to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms.

Representative aldehydes for use in the preparation of the Mannich condensation products of the present invention include, but are not limited to aliphatic aldehydes such as formaldehyde, acetaldehyde, propionaldehyde, butyraldehyde, valeraldehyde, caproaldehyde and heptaldehyde. Aromatic aldehydes are also contemplated for use in the preparation of the Mannich condensation products of the present invention, such as benzaldehyde and alkylbenzaldehyde. Para-tolualdehyde is an example of an alkylbenzaldehyde. Also useful are formaldehyde producing reagents, such as paraformaldehyde and aqueous formaldehyde solutions such as formalin. Aldehydes most preferred for use in the in the preparation of the Mannich condensation products of the present invention are paraformaldehyde and formalin.

Aldehydes most preferred for use in the in the preparation of the Mannich condensation products of the present invention are paraformaldehyde and formalin.

Preferably the aldehyde is formaldehyde. By formaldehyde is meant all its forms, including gaseous, liquid and solid. Examples of gaseous formaldehyde is the monomer $CH_2O$ and the trimer, $(CH_2O)_3$ (trioxane) having the formula given below.

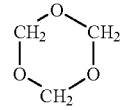

Examples of liquid formaldehyde are the following:
1. Monomer $CH_2O$ in ethyl ether.
2. Monomer $CH_2O$ in water which has the formulas $CH_2(H_2O)_2$ (methylene glycol) and $HO(-CH_2O)_n-H$.
3. Monomer $CH_2O$ in methanol which has the formulas $OHCH_2OCH_3$ and $CH_3O(-CH_2O)_n-H$.

Formaldehyde solutions are commercially available in water and various alcohols. In water it is available as a 37%-50% solution. Formalin is a 37% solution in water.

Formaldehyde is also commercially available as linear and cyclic (trioxane) polymers. Linear polymers may be low molecular weight or high molecular weight polymers.

The term "alkali metal" as used herein refers to Group I A metals of the Periodic Table, such as lithium, sodium and potassium.

The term "amino acid or ester derivative thereof" as used herein refers to amino acids and their esters having the formula

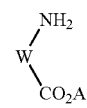

wherein W is $-[CHR'']-_m$ wherein each R'' is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4 and A is hydrogen or alkyl having one carbon atom to about 6 carbon atoms.

Preferably A is hydrogen. Preferred alkyl is methyl or ethyl.

The term amino acid salts as used herein refers to salts of amino acids having the formula

wherein W is as defined above and M is an alkali metal ion. Preferably M is a sodium ion or a potassium ion. More preferably M is a sodium ion.

The term "aromatic solvent" as used herein refers to a mixture of aromatic hydrocarbons, typically each having approximately from about 7 carbon atoms to about 14 carbon atoms.

The term "base" as used herein refers to any alkali metal base having a $pk_a$ greater than 7, preferably the base $pk_a$ is between 10 and 30. Typical bases include alkali metal hydroxides and alkali metal alkoxides. Preferably the base is an alkali metal hydroxide selected from the group consisting of sodium hydroxide, lithium hydroxide or potassium hydroxide. More preferably the alkali metal hydroxide is sodium hydroxide or potassium hydroxide. Most preferably the base is sodium hydroxide.

The term "color test" as used herein refers to the color tests used for determination of the ability of the Mannich condensation products of the present invention to sequester $Fe^{+3}$ ions. The test is briefly described below:

Test for Iron Sequestering Ability

The test used for iron sequestering ability was similar to that described in U.S. Pat. No. 4,387,244. A 0.15 to 0.25 gram sample of the Mannich condensation product of the present invention is placed into an 8 dram vial to which is added 15 milliliters toluene and shaken to homogeneity. Next 15 milliliters 0.05 molar aqueous solution of $FeCl_3$ is added to the vial and the vial is mechanically shaken for one hour. The contents of the vial are allowed to separate and the toluene layer changed color from yellow to purple, as evidence of iron being chelated, in the presence of the Mannich condensation product sequestering agents of the present invention.

The term "hydroxyl number" as used herein refers to the amount of potassium hydroxide required to neutralize the polyalkyl-substituted phenol per gram of sample (mg KOH/g sample) as measured by tetrabutylammonium hydroxide titration.

The term "Mannich condensation product" as used herein refers to a mixture of products obtained by the condensation of a polyalkyl-substituted phenol with an aldehyde and an amino acid or ester thereof, such as, glycine, in the presence of a base, to form condensation products having the formulas given below. The formula given below are provided only as some examples of the Mannich condensation products of the present invention and are not intended to exclude other possible Mannich condensation products that may be formed using the methods of the present invention.

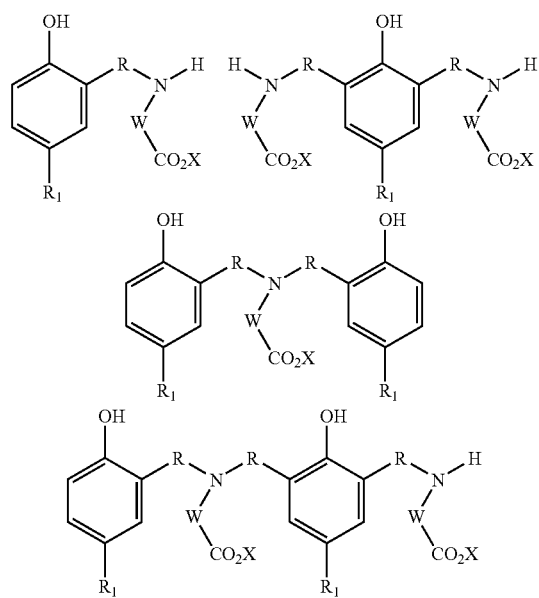

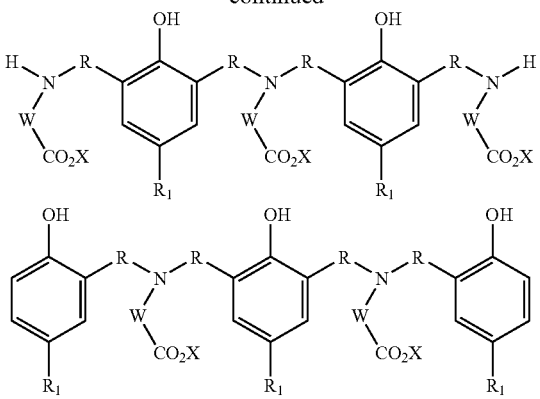

wherein each R is independently —CHR'—, wherein R' is as defined above and $R_1$ and W are as defined above, and X is hydrogen, an alkali metal ion or alkyl having one to about 6 carbon atoms;

The Mannich condensation products shown above may react further with an aldehyde and an amino acid to form larger oligomers.

In general, the principal Mannich condensation product prepared by the process of the present invention can be represented by the formula:

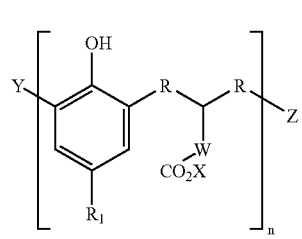

I wherein each R is independently —CHR'—, wherein R' is as defined above, $R_1$ is a polyalkyl group having a number average molecular weight in the range of about 280 to about 5,000;

X is hydrogen, an alkali metal ion, or branched or linear alkyl having one to about 6 carbon atoms;

W is —[CHR"]—$_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4;

Y is hydrogen, alkyl having one carbon atom to about 10 carbon atoms, —CHR'OH, wherein R' is as defined above, or

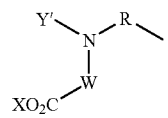

wherein Y' is —CHR'OH, wherein R' is as defined above; and R, X, and W are as defined above;

Z is hydroxyl, a hydroxyphenyl group of the formula:

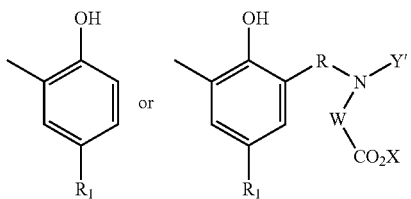

wherein R, $R_1$, Y', X, and W are as defined above, and n is an integer from 0 to 20, with the proviso that when n=0, Z must be:

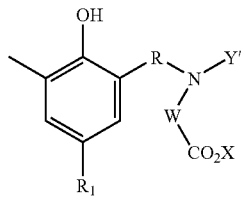

wherein R, $R_1$, Y', X, and W are as defined above

Preferably the $R_1$ polyalkyl group has a number average molecular weight of about 400 to about 3,000. More preferably the $R_1$ polyalkyl group has a number average molecular weight of about 500 to about 2,000. Even more preferably the $R_1$ polyalkyl group has a number average molecular weight of about 700 to about 1,500. Most preferably the $R_1$ polyalkyl group has a number average molecular weight of about 700 to about 1,100.

In the compound of formula I above, X is preferably hydrogen or alkali metal ion, more preferably X is an alkali metal ion and most preferably a sodium ion.

In another embodiment of the invention, in the compound of formula I above, X is alkyl selected from methyl or ethyl.

In a preferred embodiment of the Mannich condensation product of the present invention R is $CH_2$, $R_1$ has a number average molecular weight in the range of about 700 to about 1,100, W is $CH_2$, X is sodium ion and n is 0 to 20.

The term "oil of lubricating viscosity" as used herein refers to lubricating oils which may be mineral oil or synthetic oils of lubricating viscosity and preferably useful in the crankcase of an internal combustion engine. Crankcase lubricating oils ordinarily have a viscosity of about 1300 centistokes at −17.8° C. to 22.7 centistokes at 98.9° C. The lubricating oils may be derived from synthetic or natural sources. Mineral oil for use as the base oil in this invention includes paraffinic, naphthenic and other oils that are ordinarily used in lubricating oil compositions. Synthetic oils include hydrocarbon synthetic oils, synthetic esters and Fischer-Tropsch derived base oil. Useful synthetic hydrocarbon oils include liquid polymers of alpha-olefins having the proper viscosity. Especially useful are the hydrogenated liquid oligomers of $C_6$ to $C_{12}$ alpha-olefins such as 1-decene trimer. Similarly, alkyl benzenes of proper viscosity, such as didodecyl benzene, may be used. Useful synthetic esters include the esters of both mono-carboxylic acids and poly-carboxylic acids as well as mono-hydroxy alkanols and polyols. Typical examples are didodecyl adipate, pentaerythritol tetracapoate, di-2-ethylhexyl adipate, di-laurylsebacate and the like. Complex esters prepared from mixtures of mono- and di-carboxylic acid and mono- and di-hydroxy alkanols can also be used. Blends of hydrocarbon oils and synthetic oils may also be used. For example, blends of 10 weight percent to 25 weight percent hydrogenated 1-decene trimer with 75 weight percent to 90 weight percent 683 centistokes at 37.8° C. mineral oil gives an excellent oil base.

The term "polyalkyl or polyalkyl substituent" as used herein refers to the polyalkyl substituent on the hydroxyaromatic compound. The polyalkyl substituent has a number average molecular weight in the range of about 280 to about 5,000. Preferably the polyalkyl moiety has a number average molecular weight in the range of about 400 to about 5,000. More preferably the polyalkyl moiety has a number average molecular weight in the range of about 500 to about 2,000 and even more preferably the polyalkyl moiety has a number average molecular weight in the range of about 700 to about 1,500. Most preferably the polyalkyl moiety has a number average molecular weight in the range of about 700 to about 1,100. Preferably the polyalkyl group is polypropyl or polyisobutyl. Most preferably the polyalkyl group is polyisobutyl.

Preferably the attachment of the polyalkyl substituent to the phenol ring is para to the hydroxyl moiety in at least 60 percent of the total polyalkylphenol molecules, more preferably the attachment of the polyalkyl substituent to the phenol ring is para to the hydroxyl moiety in at least 80 percent of the total polyalkylphenol molecules, and most preferably the attachment of the polyalkyl substituent to the phenol ring is para to the hydroxyl moiety on the phenol ring in at least 90 percent of the total polyalkylphenol molecules.

The term "polyisobutyl-substituted phenol" as used herein refers to a polyisobutyl-substituted phenol ring. The polyisobutyl substituent is defined above. Preferably the polyisobutyl-substituted phenol is derived from polyisobutene containing at least 20 weight percent methylvinylidene isomer. More preferably the polyisobutyl-substituted phenol is derived from polyisobutene containing at least about 50 weight percent methylvinylidene isomer and most preferably the polyisobutyl-substituted phenol is derived from polyisobutene containing at least about 70 weight percent methylvinylidene isomer.

The term "sequestering agent" as used herein refers to compounds that hold a metal atom between two or more atoms of the compound, thereby neutralizing or controlling harmful metal ions, such as $Fe^{+3}$, in lubricating oil or fuel.

Unless otherwise specified, all percentages are in weight percent and the pressure is atmospheric pressure.

Process for Preparing the Mannich Condensation Product

In its broadest aspect the present invention is directed to a process for preparing Mannich condensation products, which process comprises the steps of (a) forming a reaction mixture by combining an aldehyde with a polyalkylphenol in the presence of a base, and (b) contacting the reaction mixture with an amino acid or ester thereof, a base, and optionally water, to form a product.

Conventional processes for preparing Mannich condensation product sequestering agents using amino acids as the source for the amine employ the use of alkanols, such as methanol, to assist in the handling of reactants and in conducting the Mannich reaction. The Mannich reaction in such processes is carried out with all the reactants simultaneously present in the reaction mixture without any apparent significant effect of the order of addition of individual reactants. The relatively large amounts of alkanol in the final reaction mixture must be separated from the waste water and either disposed off at great cost or recycled.

We have discovered a novel process for preparing Mannich condensation product sequestering agents using amino acids as the source for the amine. This process does not require the use of an alkanol. The process of the present invention also allows for flexibility in the type of solvent used in the Mannich reaction.

The novel process of the present invention for preparing Mannich condensation product sequestering agents using amino acids surprisingly has very strict limitations imposed on the Mannich reaction when an alkanol is not used. These limitations have not been observed in the prior art processes. The Mannich reaction in the present process does not proceed when all the reactants are simultaneously added to the reaction flask as in the prior art processes. The process of the present invention using an amino acid requires two specific and separate steps for preparing the Mannich condensation oligomer product sequestering agent.

In addition, conventional processes for preparing Mannich condensation product sequestering agents using amino acids as the source for the amine employ aromatic solvents, such as $C_9$ aromatic solvents, for solubilizing the polyalkyl-substituted hydroxyaromatic compound. The aromatic solvent must also be separated and recycled in many cases where the Mannich condensation product sequestering agent is to be used in a formulation using mineral oil because of viscosity and flash point specifications required for such formulations. We have discovered that the process of the present invention may be carried out without the use of an aromatic solvent. The process may be carried out using mineral oil or a relatively lower boiling, low flash point aromatic solvent, thus, permitting the sequestering agent to be prepared for applications requiring the sequestering agent in a mineral oil, such as Exxon® 150N, neutral oil or Chevron® 100N, neutral oil.

In addition, the process of the present invention does not require a neutralization step as used in some conventional processes for obtaining Mannich condensation products.

Without being limited to any particular theory, it is believed that in the first step of the present process a methylol intermediate is formed between polyalkylphenol and aldehyde in the presence of a of base at about 65° C. to about 95° C.

Evidence for the absolute requirement of two separate and discrete steps for carrying out the Mannich reaction in the process of the present invention was observed when a precipitate was obtained instead of the Mannich condensation product when all the reactants were simultaneously added, as in the prior art processes. The precipitate had the following formula

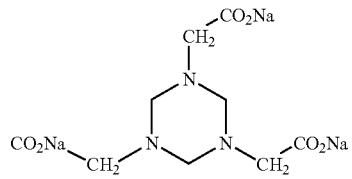

The Mannich reaction for the preparation of the Mannich condensation products of the present invention are believed to proceed as shown below.

General Procedure for Preparation of Mannich Condensation Product Sequestering Agents A typical procedure for the preparation of Mannich condensation product sequestering agents of the present invention is given below:

The method of the present invention may be conducted as a batch process, a continuous process, a semi-batch process or by any process known to persons skilled in the art.

Generally, the Mannich condensation reaction is carried out under inert gas and atmospheric pressure, under basic conditions, in two steps. However, higher and lower than atmospheric pressure may be used.

Step (a)

In Step (a) are charged with the following reactants:
1. a polyalkylphenol diluted in an inert solvent. The polyalkylphenol is stirred and heated to allow for proper agitation. To the polyalkylphenol is added
2. a base,
3. an aldehyde, Typically, the reactants may be allowed to react over a broad period of time and at a broad temperature range. In Table I below are summarized the temperature and hold time ranges for conducting Step (a).

Step (b)

In Step (b) are added
3. one or more amino acids
4. water, and
5. a base;

Typically, Step (b) is conducted in two stages. In Stage 1 of Step (b) the reactants may be allowed to react over a broad period of time and at a broad temperature range. In Stage 2 of Step (b) the temperature is increased and pressure is reduced to remove water. In Table I below are summarized the temperature and hold times ranges for conducting Step (b).

Although, the concentration of the reactants may be varied to obtain the desired product, it has been found that certain charge mole ratios of the reactants are important for obtaining high yields of the Mannich condensation products of the present invention. The charge mole ratios are described below and summarized in Table I:

Charge Mole Ratio of Polyalkyl-Substituted Phenol to Aldehyde and Base to Polyalkyl-substituted phenol In Step (a) the charge mole ratio of base to the polyalkyl-substituted phenol is present in the range of about 0.01:1.0 to about 1.0:1.0 and the charge mole ratio of aldehyde to the polyalkyl-substituted phenol is present in the range of about 0.5:1.0 to about 4.0:1.0. Preferably in step (a) the charge mole ratio of base to the polyalkyl-substituted phenol is present in the range of about 0.03:1.0 to about 0.5:1.0 and the charge mole ratio of aldehyde to the polyalkyl-substituted phenol is present in the range of about 1.0:1.0 to about 3.0:1.0. More preferably in step (a) the charge mole ratio of base to the polyalkyl-substituted phenol is present in the range of about 0.05:1.0 to about 0.15:1.0 and the charge mole ratio of aldehyde to the polyalkyl-substituted phenol is present in the range of about 1.5:1.0 to about 2.5:1.0. These charge mole ratios are also summarized in Table I below.

Charge Mole Ratio of Base to Polyalkyl-Substituted Phenol and Amine to Polyalkyl-Substituted Phenol In Step (b) the charge mole ratio of base to the polyalkyl-substituted phenol is present in the range of about 0:01 to about 1.5:1 and the charge mole ratio of amine to the polyalkyl-substituted phenol is present in the range of about 0.01:1 to about 3:1. Preferably in step (b) the charge mole ratio of base to the polyalkyl-substituted phenol is present in the range of about 0.5:1.0 to about 1.3:1 and the charge mole ratio of amine to the polyalkyl-substituted phenol is present in the range of about 0.0.5:1.0 to about 2:1.0. More preferably in step (b) the charge mole ratio of base to the polyalkyl-substituted phenol is present in the range of about 0.9:1.0 to about 1.0:1.0 and the charge mole ratio of amine to the polyalkyl-substituted phenol is present in the range of about 0.75:1.0 to about 1.5:1.0. These charge mole ratios are also summarized in Table I below.

TABLE I

| Parameter | Ranges | Preferred Ranges | More Preferred Ranges |
|---|---|---|---|
| Charge Mole ratio | | | |
| Aldehyde:Hydroxyaromatic in step (a) | 0.5:1-4:1 | 1:1-3:1 | 1.5:1-2.5:1 |
| Base:Hydroxyaromatic in step (a) | 0.01:1-1:1 | 0.03:1-0.5:1 | 0.05:1-0.15:1 |
| Base:Hydroxyaromatic in step (b) | 0.01:1-1.5:1 | 0.5:1-1.3:1 | 0.9:1-1:1 |
| Amino Acid:Hydroxyaromatic in step (b) | 0.01:1-3:1 | 0.5:1-2:1 | 0.75:1-1.5:1 |
| Water:Hydroxyaromatic in step (b) | 0:1-20:1 | 0.1:1-15:1 | 1:1-7:1 |
| Temperature Range (° C.) | | | |
| Step (a) | 50-120 | 60-100 | 70-95 |
| Stage 1* of Step (b) | 50-120 | 60-100 | 70-95 |
| Stage 2** of Step (b) | 120-190 | 140-180 | 150-175 |
| Hold time | | | |
| Step (a) (hours) | 0.2-8 | 0.5-4 | 0.5-2.5 |
| Stage 1 of Step (b) (hours) | 0-8 | 0.5-4 | 0.5-2.5 |
| Stage 2 of Step (b) (hours) | 0.2-8 | 0.5-4 | 0.5-2.5 |

*Stage 1 is described above under Step (b).
**Stage 2 is described above under Step (b).

If the Mannich condensation product sequestering agent is to be used as a fuel additive it may be desirable to replace the alkali metal ion on the Mannich condensation products with an ammonium ion. For other uses the alkali metal ion on the Mannich condensation products may also be replaced with Group II metals of the Periodic Table.

Compounds suitable for use in the preparation of the Mannich condensation products of the present invention are given below:

Polyalkyl-substituted Hydroxyaromatic Compound

A variety of polyalkyl-substituted hydroxyaromatic compounds can be utilized in the synthesis of the Mannich condensation products of this invention. The critical feature is that the polyalkyl substituent be large enough to impart oil solubility to the finished Mannich condensation product. In general the number of carbon atoms that are required to allow for oil solubility of the Mannich condensation product is on the order of about $C_{20}$ and higher. This corresponds to a molecular weight of 280 to 5,000. It is desirable that the $C_{20}$ or higher alkyl substituent on the phenol ring be located in the position para to the OH group on the phenol.

In general, one unsubstituted ortho position to the hydroxyl group on the phenol ring is required in order to synthesize the Mannich condensation products of this invention. For example phenol substituted in the para position with a substituent that contains greater than $C_{20}$ is a preferred polyalkylphenol raw material for this invention.

Di-substituted phenols are also suitable starting materials for the Mannich condensation products of this invention. Di-substituted phenols are suitable provided that they are substituted in such a way that there is an unsubstituted ortho position on the phenol ring. Examples of suitable di-substituted phenols are o-cresol derivatives substituted in the para position with a $C_{20}$ or greater alkyl substituent and the like.

A preferred polyalkyl-substituted phenol has the following formula:

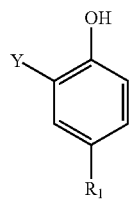

wherein $R_1$ is polyalkyl having a number average molecular weight in the range of about 280 to about 5,000, Y is hydrogen.

Preferably the $R_1$ polyalkyl group has a number average molecular weight of about 400 to about 3,000. More preferably the $R_1$ polyalkyl group has a number average molecular weight of about 500 to about 2,000. Even more preferably the $R_1$ polyalkyl group has a number average molecular weight of about 700 to about 1,500. Most preferably the $R_1$ polyalkyl group has a number average molecular weight of about 700 to about 1,100.

In the above process the polyalkyl substituent on the polyalkylphenol is derived from polypropylene, polybutene, or a polyalphaolefin oligomer of 1-octene or 1-decene.

The polyalkylphenol in the above process is polypropylphenol or polyisobutyl-substituted phenol. Preferably in the above process the polyisobutyl-substituted phenol is derived from polyisobutene containing at least about 20 weight percent methylvinylidene isomer. More preferably the polyisobutyl-substituted phenol is derived from polyisobutene containing at least about 50 weight percent methylvinylidene isomer and most preferably the polyisobutyl-substituted phenol is derived from polyisobutene containing at least about 70 weight percent methylvinylidene isomer.

Suitable polyisobutenes may be prepared using boron trifluoride ($BF_3$) alkylation catalyst as described in U.S. Pat. Nos. 4,152,499 and 4,605,808.

Commercially available polyisobutenes having a high alkylvinylidene content include Glissopal® 1000, 1300 and 2200, available from BASF.

The preferred polyalkylphenol for use in the preparation of the Mannich condensation products of the present invention is a mono-substituted phenol, wherein the polyalkyl substituent is attached at the para-position to the phenol ring. However, other polyalkylphenols that may undergo the Mannich condensation reaction may also be used for preparation of the Mannich condensation products of the present invention. Some examples of such polyalkylphenols are mono-substituted and di-substituted ortho-substituted polyalkylphenols.

Inert Solvent

Inert solvents may be employed to facilitate handling and reaction of the polyalkylphenols in the preparation of the Mannich condensation products of the present invention. Examples of suitable inert solvents are hydrocarbon compounds such as heptane, benzene, toluene, chlorobenzene, aromatic solvent, neutral oil of lubricating viscosity, paraffins and naphthenes. Examples of other commercially available suitable solvents include Chevron® 100N, neutral oil and Exxon® 150N, neutral oil.

If the Mannich condensation product sequestering agent prepared by the above process is to be used as an additive in lubricating oil, then in step (a) the polyalkylphenol may be first dissolved in a suitable solvent, such as Chevron® 100Neutral Oil.

Base

Bases useful for the preparation of the Mannich condensation products of the present invention may be any alkali metal base having a $pk_a$ greater than 7, preferably the base $pk_a$ is between 10 and 30. Typical bases include alkali metal hydroxides and alkali metal alkoxides. Preferably the base is an alkali metal hydroxide selected from the group consisting of sodium hydroxide, lithium hydroxide or potassium hydroxide. More preferably the alkali metal hydroxide is sodium hydroxide or potassium hydroxide. Most preferably the base is sodium hydroxide.

Aldehyde

Aldehydes contemplated for use in the process of the present invention are formaldehyde and aldehydes having the formula

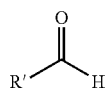

wherein R' is branched or linear alkyl having from one carbon atom to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms.

Representative aldehydes for use in the preparation of the Mannich condensation products of the present invention include, but are not limited to aliphatic aldehydes such as formaldehyde, acetaldehyde, propionaldehyde, butyraldehyde, valeraldehyde, caproaldehyde and heptaldehyde.

Aromatic aldehydes are also contemplated for use in the preparation of the Mannich condensation products of the present invention, such as benzaldehyde and alkylbenzaldehyde. Para-tolualdehyde is an example of an alkylbenzaldehyde.

Also useful are formaldehyde producing reagents, such as paraformaldehyde and aqueous formaldehyde solutions such as formalin. Aldehydes most preferred for use in the in the preparation of the Mannich condensation products of the present invention are paraformaldehyde and formalin.

Aldehydes most preferred for use in the in the preparation of the Mannich condensation products of the present invention are paraformaldehyde and formalin.

Preferably the aldehyde is formaldehyde. By formaldehyde is meant all its forms, including gaseous, liquid and solid. Examples of gaseous formaldehyde is the monomer $CH_2O$ and the trimer, $(CH_2O)_3$ (trioxane) having the formula given below.

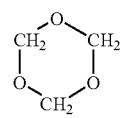

Examples of liquid formaldehyde are the following:
4. Monomer $CH_2O$ in ethyl ether.
5. Monomer $CH_2O$ in water which has the formulas $CH_2(H_2O)_2$ (methylene glycol) and $HO(-CH_2O)_n-H$.
6. Monomer $CH_2O$ in methanol which has the formulas $OHCH_2OCH_3$ and $CH_3O(-CH_2O)_n-H$.

Formaldehyde solutions are commercially available in water and various alcohols. In water it is available as a 37%-50% solution. Formalin is a 37% solution in water.

Formaldehyde is also commercially available as linear and cyclic (trioxane) polymers. Linear polymers may be low molecular weight or high molecular weight polymers.

Amino Acid

The amino acid or ester derivative thereof in the above process has the formula

W is $-[CHR'']-_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; and m is an integer from one to 4, and A is hydrogen or alkyl having one carbon atom to about 6 carbon atoms.

Preferably A is hydrogen in the above formula. The preferred alkyl in the above formula is methyl or ethyl.

Preferably the amino acid is glycine.

Some examples of alpha amino acids contemplated for use in the preparation of the Mannich condensation products of the present invention are given below in Table II.

TABLE II

| Name | Structure | Log $K^{25° C., 0\ ionic\ strength}$ |
|---|---|---|
| Alanine | $H_3C-\underset{\underset{OH}{\overset{\|}{C=O}}}{\overset{NH_2}{\overset{\|}{CH}}}$ | 9.87 |
| Arginine | $H_2N-\underset{\underset{NH}{\|\|}}{C}-\overset{H}{\underset{\|}{C}}-\overset{H_2}{C}-\overset{H_2}{C}-\overset{H_2}{C}-\underset{\underset{OH}{\overset{\|}{C=O}}}{\overset{NH_2}{\overset{\|}{CH}}}$ | 8.99 |

TABLE II-continued
| Name | Structure | Log K$^{25°\ C.,\ 0\ ionic\ strength}$ |
|---|---|---|
| Asparagine | 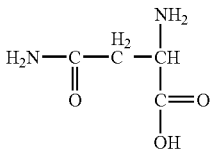 | 8.72* |
| Aspartic Acid | 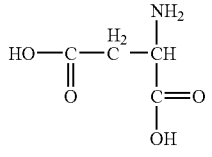 | 10.0 |
| Cysteine | 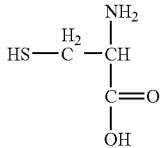 | 10.77 |
| Cystine | 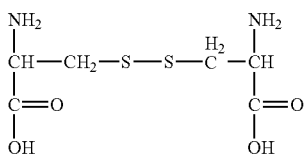 | 8.80** |
| Glutamic Acid | 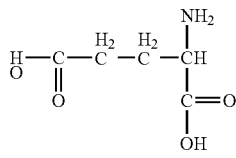 | 9.95 |
| Glutamine | 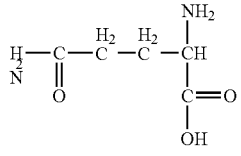 | 9.01* |
| Glycine | 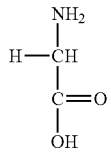 | 9.78 |
| Histidine | 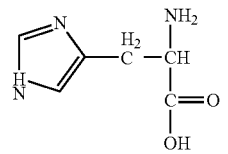 | 9.08* |
| Hydroxylysine | 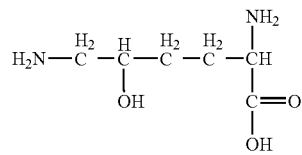 | |

TABLE II-continued

| Name | Structure | Log K$^{25°\ C.,\ 0\ ionic\ strength}$ |
|---|---|---|
| Isoleucine | | 9.75 |
| Leucine | | 9.75 |
| Lysine | | 10.69* |
| Methionine | | 9.05 |
| Phenylalanine | | 9.31 |
| Serine | | 9.21 |
| Threonine | | 9.10 |
| Tyrosine | | 10.47 |
| Valine | | 9.72 |

*0.1 ionic strength.
**20° C. and 0.1 ionic strength.

In a preferred embodiment of the present process, before performing step (b), the amino acid, base and water are first combined separately at a temperature in the range of about 15° C. to about 100° C. to form a concentrated amino acid salt solution and then added to the reaction mixture formed in step (a). Preferably before performing step (b) the amino acid, base and water are first combined separately at a temperature in the range of about 30° C. to about 70° C. to form a concentrated amino acid salt solution and then added to the reaction mixture formed in step (a). More preferably before performing step (b) the amino acid, base and water are first combined separately at a temperature in the range of about 40° C. to about 60° C. to form a concentrated amino acid salt solution and then added to the reaction mixture formed in step (a).

EXAMPLES

Example 1

Preparation of Mannich Condensation Product Using 1,000 Molecular Weight Polyisobutyl-substituted Phenol

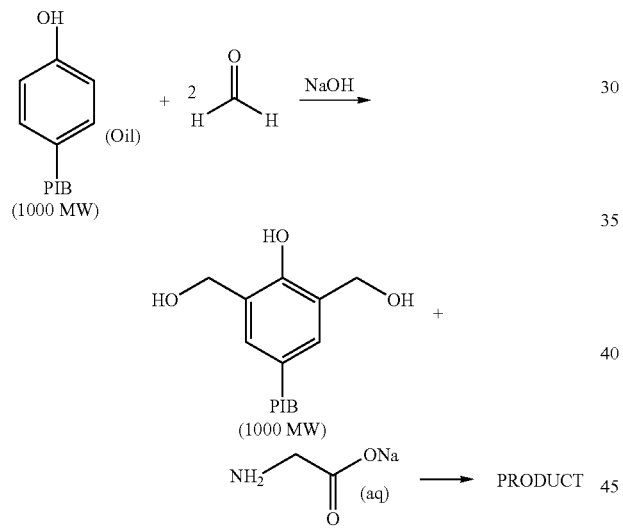

In a one liter round-bottom flask was added 351.09 grams (0.23 moles) of 1,000 molecular weight polyisobutyl substituted phenol as defined in the Definitions section. The polyisobutyl-substituted phenol used in this Example and in the following Examples in the present patent application was prepared as described in U.S. Pat. Nos. 5,300,701 and 6,274,777. The polyisobutyl-substituted phenol, diluted in 31 percent Chevron® 100N, neutral oil (hydroxyl number=36.77 milligram KOH per gram sample) was combined with 2.88 grams (0.036 moles) aqueous sodium hydroxide (Aldrich® 50% solution). The mixture was stirred and heated at about 35° C. under nitrogen. After approximately 15 minutes, when the mixture was homogenized, 14.99 grams (0.46 moles) paraformaldehyde (Celanese® prills 92.56%) was added to the reaction flask. Temperature of the reaction mixture was increased to about 75° C. and the pressure was reduced from atmospheric to 250 millimeters Hg. The reaction mixture in the flask was maintained at a temperature of about 75° C. and a pressure of 250 millimeters Hg for about 1.5 hours. A sample of less than 0.2 grams was removed for determination of the formula of the product by $^1$H-NMR. The intermediate product primarily formed had the following formula

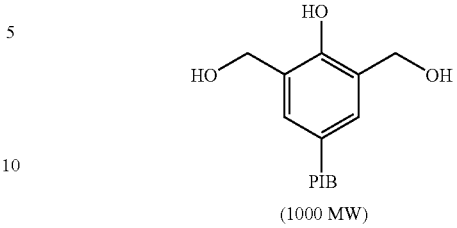

In a four ounce bottle was prepared a solution by mixing 18.02 grams (0.24 moles) glycine (Fisher Biotech® 98.5%), 15.94 grams (0.2 moles) sodium hydroxide (Aldrich® 50% aqueous solution) and 2.72 grams deionized water. The bottle was shaken until the contents formed a mostly homogeneous solution with some particles suspended.

Next 34.98 grams of the above sodium glycine solution was added to the flask. Pressure in the flask was reduced from atmospheric pressure to 300 millimeters Hg. The contents of the flask were held at about 75° C. and a pressure of 300 millimeters Hg for about 2 hours. Next the temperature of the contents of the flask was increased to about 85° C. and held at this temperature for an additional 3 hours. The vacuum was released, the contents of the flask were returned to atmospheric pressure, and three drops of defoamer (Dow Corning® 200 Fluid) were added to the flask. After the addition of the defoamer, water was removed by heating the contents of the flask to 160° C. and reducing the pressure to 50 millimeters Hg. A hazy, light amber colored product 375.31 grams was obtained. The product was filtered to yield a clear, light amber colored Mannich condensation product, which sequestered $Fe^{+3}$ as determined by the color test, namely the Test for Iron Sequestering Ability, as described in the Definitions section.

Example 2

Preparation of Mannich Condensation Product Using 1,000 Molecular Weight Polyisobutyl-substituted Phenol Mannich condensation product was prepared in a 4 liter reactor.

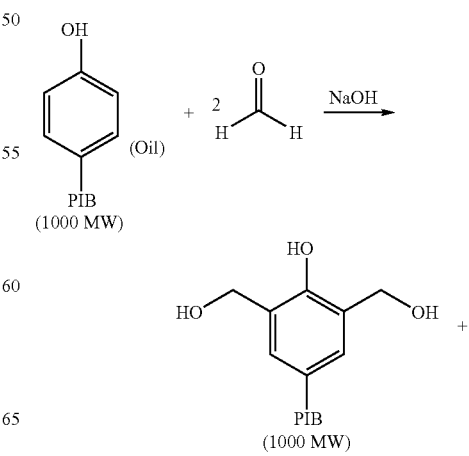

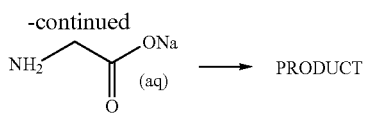 → PRODUCT

To a 4 liter reactor equipped with a temperature probe, an overhead system and a mechanical stirrer was added 2,500.5 grams (1.638 moles) of 1,000 molecular weight polyisobutyl-substituted phenol. The polyisobutyl-substituted phenol was diluted 31% in Chevron® 100N, neutral oil (hydroxyl number=36.77 milligram KOH per gram sample) and heated to 80° C. When the temperature of the contents of the reactor had reached 80° C., 13.2 grams (0.164 moles) sodium hydroxide solution (Aldrich® 49.4% aqueous solution) was added to the reactor, followed quickly with the addition of 109.7 grams (3.277 moles) paraformaldehyde (Celanese® prills 92.56%). The reaction mixture was maintained at a temperature between about 80° C. to about 90° C. for 1.5 hours. A $^1$H NMR was taken on a sample at this point in the reaction. The intermediate was determined to have the following formula:

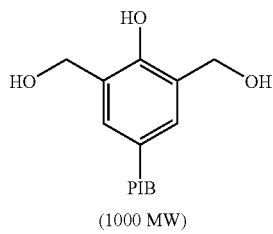

Next 270.2 grams sodium glycine solution, as prepared in Example 1, was added to the reaction mixture. This solution was made by mixing 122.2 grams (1.53 moles) sodium hydroxide solution (Aldrich® 49.4% aqueous solution) with 128.5 grams (1.71 moles) glycine (Fisher Biotech® 100.3%) and 25 grams deionized water. This solution, along with 2 drops defoamer (Dow Corning® 200 Fluid), was added to the reaction mixture at about 80° C. The temperature was held at about 80° C. for 1.5 hours. Next the temperature was slowly increased to 160° C. When the temperature had reached 160° C., the pressure was reduced from atmospheric to 50 millimeters Hg to remove any remaining water from the product. These reaction conditions were held for one hour. A Mannich condensation product was obtained which sequestered $Fe^{+3}$ as determined by the color test, Test for Iron Sequestering Ability, described in the Definitions section.

Comparative Example A

Attempted Preparation of Mannich Condensation Product Using 1,000 Molecular Weight Polyisobutyl-substituted Phenol The process of Example 1 was carried out, except paraformaldehyde was added last.

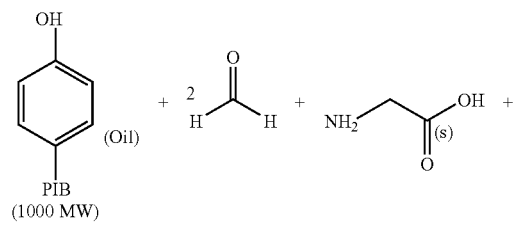

NaOH → 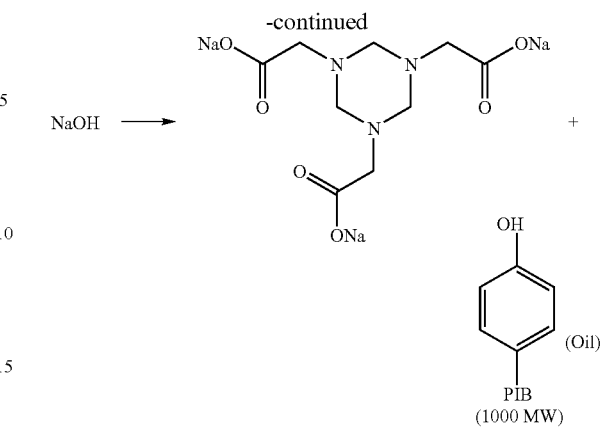

To a 1 liter Morton flask was added 429.17 grams (0.281 moles) 1,000 molecular weight polyisobutyl-substituted phenol, as defined in the Definitions section, diluted in Chevron 100Neutral® oil (hydroxyl number=36.77 milligrams KOH per gram sample) and 11.92 grams (0.29 moles) sodium hydroxide pellets (Fisher® 98.1%). The reaction mixture was warmed to 50° C. and allowed to mix for approximately one hour. To the reaction mixture was added 21.4 grams (0.281 moles) glycine (Fisher Biotech® 100.3%, solid), quickly followed by 18.82 grams (0.58 moles) paraformaldehyde (Celanese® prills 92.56%). To the reaction mixture two drops of defoamer (Dow Corning 200 Fluid®) was added to reduce foaming. The reaction mixture was stirred and heated to about 90° C. under nitrogen and held between the temperatures of about 70° C. to about 90° C. for approximately one hour. An additional two drops of defoamer (Dow Corning® 200 Fluid) was added to reduce foaming. The temperature was then slowly increased over 1.5 hours to about 160° C. Pressure was reduced from atmospheric pressure to 250 millimeters Hg using a vacuum pump. These reaction conditions were held for about 2 hours. Next stirring was stopped and the mixture was allowed to separate into two phases, a solid phase and a liquid phase. A sample of the reaction mixture analyzed by $^1$H-NMR showed the liquid phase to be primarily unreacted polyisobutyl-substituted phenol. The reaction mixture was then heated to 175° C. and the pressure was reduced to approximately 400 millimeters Hg. These reaction conditions were held for 3 hours. Again, the mixture was allowed to separate into two phases. As determined by $^1$H-NMR, the liquid phase was still primarily unreacted polyisobutyl-substituted phenol and the solid phase primarily had the formula below.

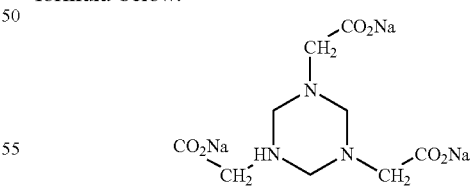

Comparative Example B

Attempted Preparation of Mannich Condensation Product Using 1,000 Molecular Weight Polyisobutyl-substituted Phenol The process of Example 1 was carried out, except that sodium glycine was added to the reaction mixture before the paraformaldehyde.

A 488.87 gram (0.281 moles) 1,000 molecular weight polyisobutyl-substituted phenol sample, as defined in the Definitions section, diluted in 25% aromatic solvent, (hydroxyl number=46.1 milligrams KOH per gram sample) was stripped by taking the sample to 160° C. at a pressure of 5 millimeters Hg on a Buchi Rotovap®. This process yielded 389.96 grams of the stripped material. To a 1 liter round-bottom flask was added 161.62 grams (0.15 moles) of the stripped product and 75.86 grams Chevron® 100N, neutral oil. In a 400 milliliter beaker was prepared a solution of 5.97 grams (0.13 moles) sodium hydroxide pellets (Fisher® 98.1%), 21.4 grams (0.281 moles) solid glycine (Fisher Biotech® 100.3%) and 56.5 grams deionized water. To the reaction mixture in the round-bottom flask was added 65.84 grams of the homogeneous solution from the 400 milliliter beaker. The combined reaction mixture in the flask was heated to 110° C. and held for about 30 minutes. The reaction mixture was further heated to 115° C. and the pressure was reduced to 200 millimeters Hg using a vacuum pump. Next one drop of defoamer (Dow Corning 200 Fluid®) was added to the reaction mixture. Next 8.12 grams (0.26 moles) paraformaldehyde (Celanese® prills, 92.58%) was added to the reaction mixture. The reaction mixture was heated to 170° C. and held at this temperature for 3 hours. A sample of the reaction mixture analyzed by $^1$H NMR showed the liquid phase to be primarily unreacted poly-isobutyl-substituted phenol.

A Mannich condensation product was not obtained from this Example. This Example shows that the addition of sodium glycine before the addition of paraformaldehyde does not provide a Mannich condensation product, and did not sequester $Fe^{+3}$ as determined by the color test described in the Definitions section.

Comparative Example C

Attempted Preparation of Mannich Condensation Product Using 1,000 Molecular Weight Polyisobutyl-substituted Phenol The process of Example 1 was carried out, except that sodium hydroxide and glycine were added to the reaction mixture before the polyisobutyl-substituted phenol and the paraformaldehyde.

To a 1 liter round-bottom flask were added 12.38 grams (0.31 moles) sodium hydroxide (Fisher®, reagent grade), 22.91 grams (0.31 moles) glycine (Fisher Biotech®, culture grade) and 77.95 grams deionized water. The reaction mixture was stirred under nitrogen and heated to about 35° C. The reaction mixture exothermed to 55° C. as the solutes went into solution. After approximately 20 minutes, 422.36 grams (0.31 moles) 1,000 molecular weight polyisobutene-substituted phenol sample, as defined in the Definitions section, diluted in about 25% aromatic solvent (hydroxyl number=41.3 milligrams KOH per gram sample) was added to the reaction mixture, quickly followed by 18.96 grams (0.62 moles) paraformaldehyde (Celanese® prills, 92.56%). The reaction mixture in the flask was heated to 120° C. and allowed to reflux for 2 hours. The solvent was then distilled off by attaching a Dean-Starke® trap and heating the reaction mixture to 170° C. and holding at this temperature for 6 hours. To the reaction mixture was added 82.22 grams Chevron® 100N, neutral oil, as the reaction mixture cooled to room temperature. A sample of the reaction mixture analyzed by $^1$H NMR showed the liquid phase to be primarily unreacted polyisobutyl-substituted phenol.

A Mannich condensation product was not obtained from this Example. This Example shows that the addition of sodium hydroxide and glycine before the addition of poly-isobutyl-substituted phenol and paraformaldehyde does not provide the desired Mannich condensation product.

Without being bound by any theory, it is believed that the Mannich condensation product was not formed because the order of addition of the reactants did not permit the formation of the required intermediate as shown below.

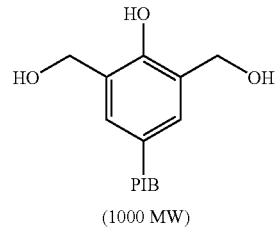

(1000 MW)

Comparative examples were conducted to determine whether excluding the alkanol from the present process would still permit the addition of the reactants in any order as in conventional processes. Comparative Examples A-C described above and summarized in Table III show that when alkanol is excluded from the present process, the present process must be conducted in two steps and the order of the addition of the reactants is important for obtaining a Mannich condensation product.

TABLE III

| Example | Addition of polyisobutyl-phenol* | Addition of formaldehyde | Addition of glycine | Mannich Condensation Product |
|---|---|---|---|---|
| Example 1 | First | Second | Third | Yes |
| Example 2 | First | Second | Third | Yes |
| Comparative A | First | | Second | No |
| Comparative B | First | Third | Second | No |
| Comparative C | Second | Third** | First | No |

*Polyisobutyl-substituted phenol in Chevron ® 100N, neutral oil.
**The formaldehyde was quickly added after the polyisobutyl-substituted-phenol.

What is claimed is:

1. A process for preparation of a Mannich condensation product comprising the steps of:
   (a) forming a reaction mixture of a polyalkyl-substituted hydroxyaromatic compound, wherein the polyalkyl group has a number average molecular weight of from about 280 to about 5,000 and an aldehyde in the presence of an alkali metal base; and
   (b) contacting the reaction mixture with an amino acid or ester derivative thereof and an alkali metal base.

2. The process of claim 1, wherein each of the steps (a) and (b) is independently conducted in the absence of an alkanol.

3. A process for preparing a Mannich condensation product sequestering agent comprising the steps of:
   (a) forming a reaction mixture by combining an aldehyde comprising:
   formaldehyde or an aldehyde having the formula

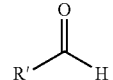

wherein R' is branched or linear alkyl having one carbon atom to about 10 carbon atoms, cycloalkyl having from about 3 carbon atoms to about 10 carbon atoms, aryl having from about 6 carbon atoms to about 10 carbon atoms, alkaryl having from about 7 carbon atoms to about 20 carbon atoms, or aralkyl having from about 7 carbon atoms to about 20 carbon atoms;

with a polyalkyl-substituted hydroxyaromatic compound having the formula

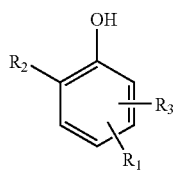

wherein $R_1$ is polyalkyl of 280 to 5,000 molecular weight, $R_2$ is hydrogen or lower alkyl having one carbon atom to about 10 carbon atoms, and $R_3$ is hydrogen or —OH, in the presence of a base; and (b) contacting the reaction mixture with an amino acid or the ester derivative thereof having the formula

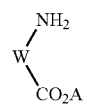

wherein W is —[CHR"]—$_m$ wherein each R" is independently H, alkyl having one carbon atom to about 15 carbon atoms, or a substituted-alkyl having one carbon atom to about 10 carbon atoms and one or more substituents selected from the group consisting of amino, amido, benzyl, carboxyl, hydroxyl, hydroxyphenyl, imidazolyl, imino, phenyl, sulfide, or thiol; m is an integer from one to 4, and A is hydrogen or alkyl having one carbon atom to about 6 carbon atoms; and a base to form the Mannich condensation product.

4. The process of claim 3, wherein the polyalkyl substituent on the polyalkyl-substituted hydroxyaromatic compound in Step (a) has a number average molecular weight of about 400 to about 3,000.

5. The process of claim 4, wherein the polyalkyl substituent on the polyalkyl-substituted hydroxyaromatic compound in Step (a) has a number average molecular weight of about 500 to about 2,000.

6. The process of claim 5, wherein the polyalkyl substituent on the polyalkyl-substituted hydroxyaromatic compound in Step (a) has a number average molecular weight of about 700 to about 1,500.

7. The process of claim 6, wherein the polyalkyl substituent on the polyalkyl-substituted hydroxyaromatic compound in Step (a) has a number average molecular weight of about 700 to about 1,100.

8. The process of claim 3, wherein the polyalkyl substituent on the polyalkyl-substituted hydroxyaromatic compound in Step (a) is derived from polypropylene, polybutene, or a polyalphaolefin oligomer of 1-octene or 1-decene.

9. The process of claim 3, wherein the polyalkyl-substituted hydroxyaromatic compound in Step (a) is polypropyl-substituted phenol or polyisobutyl-substituted phenol.

10. The process of claim 9, wherein the polyalkyl-substituted hydroxyaromatic compound in Step (a) is polyisobutyl-substituted phenol.

11. The process of claim 10, wherein the polyisobutyl-substituted phenol is derived from polyisobutene containing at least about 20 weight percent methylvinylidene isomer.

12. The process of claim 3, wherein the formaldehyde in Step (a) is, paraformaldehyde or formalin.

13. The process of claim 12, wherein the formaldehyde in Step (a) is paraformaldehyde.

14. The process of claim 3, wherein Step (a) is conducted for a period of about 0.2 hours to about 8 hours at a temperature in the range of about 50° C. to about 120° C.

15. The process of claim 3, wherein the reaction mixture formed in Steps (a) is contacted with an amino acid salt.

16. The process of claim 15, wherein the amino acid salt is prepared by first separately combining the amino acid, base and water at a temperature in the range of about 15° C. to about 100° C. to form a concentrated amino acid salt solution and then added to the reaction mixture formed in Step (a).

17. The process of claim 16, wherein the amino acid salt is prepared by first separately combining the amino acid, base and water at a temperature in the range of about 30° C. to about 70° C. to form a concentrated amino acid salt solution and then added to the reaction mixture formed in Step (a).

18. The process of claim 17, wherein the amino acid salt is prepared by first separately combining the amino acid, base and water at a temperature in the range of about 40° C. to about 60° C. to form a concentrated amino acid salt solution and then added to the reaction mixture formed in Step (a).

19. The process of claim 3, wherein the base in each of Steps (a) and (b) is independently an alkali metal hydroxide selected from the group consisting of sodium hydroxide, lithium hydroxide or potassium hydroxide.

20. The process of claim 19, wherein the base is sodium hydroxide.

21. The process of claim 3, wherein in Step (b) the amino acid is glycine.

22. The process of claim 3, wherein Step (b) is conducted in two stages, Stage 1 and Stage 2, wherein Stage 1 of Step (b) is conducted for a period of about 0.2 hours to about 8 hours at a temperature in the range of about 50° C. to about 120° C., and then Stage 2 of Step (b) is conducted for an additional period of about 0.2 hours to about 8 hours at a final temperature in the range of about 120° C. to about 190° C.

23. The process of claim 3, wherein in Step (a) the molar ratio of base to the polyalkyl-substituted hydroxyaromatic compound is in the range of about 0.01:1 to about 1:1 and the molar ratio of aldehyde to the polyalkyl-substituted hydroxyaromatic compound is present in the range of about 0.5:1 to about 4:1.

24. The process of claim 3, wherein in Step (b) the molar ratio of base to the polyalkyl-substituted hydroxyaromatic compound is in the range of about 0.01:1 to about 1.5:1 and the molar ratio of amine to the polyalkyl-substituted hydroxyaromatic compound is present in the range of about 0.01:1 to about 3:1.

25. The process of claim 3, wherein each of Steps (a) and (b) is independently conducted in the absence of an alkanol.

26. The process of claim 3, wherein in Step (a) the polyalkyl-substituted hydroxyaromatic compound is first dissolved in an oil of lubricating viscosity.

27. The process of claim 26, wherein the oil of lubricating viscosity is neutral oil.

* * * * *